(12) United States Patent
Blum et al.

(10) Patent No.: US 9,194,462 B2
(45) Date of Patent: Nov. 24, 2015

(54) HANDHELD POWER TOOL HAVING A PLANETARY GEAR SET

(71) Applicants: Jens Blum, Filderstadt (DE); Tobias Herr, Stuttgart (DE)

(72) Inventors: Jens Blum, Filderstadt (DE); Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 80 days.

(21) Appl. No.: 13/856,959

(22) Filed: Apr. 4, 2013

(65) Prior Publication Data

US 2013/0267374 A1 Oct. 10, 2013

(30) Foreign Application Priority Data

Apr. 5, 2012 (DE) .......................... 10 2012 205 718
Jul. 9, 2012 (DE) .......................... 10 2012 211 914

(51) Int. Cl.
| | | |
|---|---|---|
| F16H 3/64 | (2006.01) | |
| F16H 3/44 | (2006.01) | |
| B25F 5/00 | (2006.01) | |
| F16H 3/78 | (2006.01) | |
| F16H 55/08 | (2006.01) | |

(52) U.S. Cl.
CPC ............ *F16H 3/44* (2013.01); *B25F 5/001* (2013.01); *F16H 3/78* (2013.01); *F16H 55/0873* (2013.01)

(58) Field of Classification Search
CPC .......... F16H 3/78; F16H 55/0873; F16H 3/44
USPC .................... 475/320, 303, 298, 299
See application file for complete search history.

(56) References Cited

U.S. PATENT DOCUMENTS

| | | | |
|---|---|---|---|
| 4,791,833 A | 12/1988 | Sakai et al. | |
| 6,248,038 B1* | 6/2001 | Nilsson et al. | 475/286 |
| 2006/0068968 A1* | 3/2006 | Eisenhardt | 475/299 |
| 2011/0147021 A1* | 6/2011 | Schaal et al. | 173/47 |

FOREIGN PATENT DOCUMENTS

| | | |
|---|---|---|
| DE | 44441793 A1 | 5/1996 |
| DE | 10 2009 051844 A1 | 5/2011 |

* cited by examiner

*Primary Examiner* — Ramya Burgess
*Assistant Examiner* — Lillian Nguyen
(74) *Attorney, Agent, or Firm* — Kenyon & Kenyon LLP (57) ABSTRACT

In a handheld power tool having a planetary gear set which is at least switchable between a first and a second gear and which is assigned a switching annulus gear which is at least shiftable between a first and a second switching position and which has the first switching position in the first gear and the second switching position in the second gear, the switching annulus gear is assigned a synchronization unit which is designed to enable a synchronization of the switching annulus gear with a planet carrier or with a blocking element of the planetary gear set when the switching annulus gear is shifted between the first and the second switching position to switch over the planetary gear set.

22 Claims, 6 Drawing Sheets

HANDHELD POWER TOOL HAVING A PLANETARY GEAR SET

CROSS REFERENCE

The present application claims the benefit under 35 U.S.C. §119 of German Patent Application Nos. DE 102012205718.8 filed on Apr. 5, 2012, and DE 102012211914.0 filed on Jul. 9, 2012, both of which are expressly incorporated herein by reference in their entirety.

FIELD

The present invention relates to a handheld power tool having a planetary gear set which is at least switchable between a first and a second gear and which is assigned a switching annulus gear which is at least shiftable between a first and a second switching position and which has the first switching position in the first gear and the second switching position in the second gear.

BACKGROUND INFORMATION

Conventional handheld power tools have a switching annulus gear assigned to a planetary gear set. In conventional handheld power tools, the first gear, this switching annulus gear may be in a first switching position, e.g., axially spaced apart from a planet carrier of a first planetary stage and be operatively meshed with a blocking element to enable a rotational speed reduction by the planetary gear set, and in the second gear it may be in a second switching position, e.g., spaced apart from the blocking element and operatively meshed with the planet carrier to prevent the rotational speed reduction by the planetary gear set.

The disadvantage is that the switching annulus gear is rotatably fixedly situated in an appropriate gear housing of the handheld power tool in the first gear of the planetary gear set of such a handheld power tool and must be operatively meshed with the planet carrier of the first planetary stage during the switchover into the second gear, the planet carrier rotating at a rotational speed assigned to the first gear. In this case, since an at least generally idle internal toothing of the switching annulus gear must mesh with the external toothing of the planet carrier rotating at the assigned rotational speed, it may occur that, on the one hand, an appropriate switchover process is not possible or, however, that, on the other hand, it may result both in unfavorable wear on the toothings and in an undesirable noise generation.

SUMMARY

One object of the present invention is therefore to provide a novel handheld power tool having a planetary gear set which is switchable at least between a first and a second gear and in which, on the one hand, a switchover process is made possible at full rotational speed and, on the other hand, wear and noise generation may be at least reduced during the switchover between the first and the second gear.

In accordance with an example embodiment of the present invention, a handheld power tool is provided having a planetary gear set which is at least switchable between a first and a second gear and which is assigned a switching annulus gear which is at least shiftable between a first and a second switching position and which has the first switching position in the first gear and the second switching position in the second gear. The switching annulus gear is assigned a synchronization unit which is designed to enable a synchronization of the switching annulus gear with a planet carrier or with a blocking element of the planetary gear set when the switching annulus gear is shifted between the first and the second switching position to switch over the planetary gear set.

The present invention thus allows the provision of a handheld power tool, in which an improvement of a corresponding switching behavior of the planetary gear set is enabled when switching between the first and the second gear, so that wear and noise generation may be at least reduced during the switchover.

According to one specific embodiment, the switching annulus gear is rotatably fixedly situated in an assigned gear housing in the first gear of the planetary gear set, and rotatably mounted in the gear housing in the second gear of the planetary gear set. The switching annulus gear preferably has an internal toothing and the planet carrier an external toothing. In the second gear of the planetary gear set, the internal toothing is preferably operatively meshed with the external toothing.

The provision of a fail-safe and robust planetary gear set is thus made possible.

The internal toothing preferably has a plurality of teeth pointing radially inward, a predefined number of teeth being shortened in the longitudinal direction.

In this way, the provision of a simple and cost-effective synchronization unit may be enabled using which a safe and reliable synchronization of the switching annulus gear and the planet carrier is achieved during the switchover from the first into the second gear of the planetary gear set.

Each tooth of the predefined number of teeth is preferably shortened by at least 0.2 mm in the longitudinal direction.

The provision of a functionally safe and reliable synchronization unit may thus be made possible.

In an axial end area of the switching annulus gear, which faces the planet carrier, a dent assigned to the synchronization unit is preferably formed at each tooth of the predefined number of teeth to shorten the tooth. In the peripheral direction of the switching annulus gear, at least every other of the teeth pointing radially inward is preferably shortened in the longitudinal direction.

In this way, the provision of an enlarged radial tooth clearance is enabled in a simple manner during the switchover.

According to one specific embodiment, the external toothing has a plurality of teeth pointing radially outward, a predefined number of teeth being shortened in the longitudinal direction.

In this way, the provision of a simple and cost-effective synchronization unit may be enabled using which a safe and reliable synchronization of the switching annulus gear and the planet carrier is achieved during the switchover from the first into the second gear of the planetary gear set.

Each tooth of the predefined number of teeth is preferably shortened by at least 0.2 mm in the longitudinal direction.

The provision of a functionally safe and reliable synchronization unit may thus be made possible.

On a side of the planet carrier which faces the switching annulus gear, a dent assigned to the synchronization unit is preferably formed at each tooth of the predefined number of teeth to shorten the tooth. In the peripheral direction of the planet carrier, at least every other of the teeth pointing radially outward is preferably shortened in the longitudinal direction.

In this way, the provision of an enlarged radial tooth clearance is enabled in a simple manner during the switchover.

According to one specific embodiment, an external blocking toothing is provided on the switching annulus gear, the external toothing being designed to enable a rotatably fixed blockage of the switching annulus gear in the gear housing in the first gear of the planetary gear set. In the gear housing, an internal toothing is preferably provided which is operatively meshed with the external blocking toothing in the first gear of the planetary gear set.

The present invention thus enables the provision of a handheld power tool in which the switching annulus gear assigned to the planetary gear set may be, in the first gear, safely and reliably blocked in the gear housing in a rotatably fixed manner.

At least the external blocking toothing preferably has at least one predefined number of blocking teeth at which the stepped meshing areas are formed which are assigned to the synchronization unit.

In this way, the provision of a simple and cost-effective synchronization unit may be made possible using which a safe and reliable synchronization of the switching annulus gear and the gear housing is achieved during the switchover from the second into the first gear of the planetary gear set.

According to one specific embodiment, the internal toothing is provided on the blocking element.

The present invention thus enables the provision of a handheld power tool in which a simple and cost-effective component may be used to rotatably fixedly block the switching annulus gear assigned to the planetary gear set in the first gear of the planetary gear set in the gear housing.

In accordance with the present invention, a planetary gear set is provided which is at least switchable between a first and a second gear and which is assigned a switching annulus gear which is at least shiftable between a first and a second switching position and which has the first switching position in the first gear and the second switching position in the second gear. The switching annulus gear is assigned a synchronization unit which is designed to enable a synchronization of the switching annulus gear with a planet carrier or with a blocking element of the planetary gear set when the switching annulus gear is shifted between the first and the second switching position to switch over the planetary gear set.

BRIEF DESCRIPTION OF THE DRAWINGS

The present invention is explained in greater detail below with reference to the exemplary embodiments shown in the figures.

DETAILED DESCRIPTION OF EXAMPLE EMBODIMENTS

Figure 1:
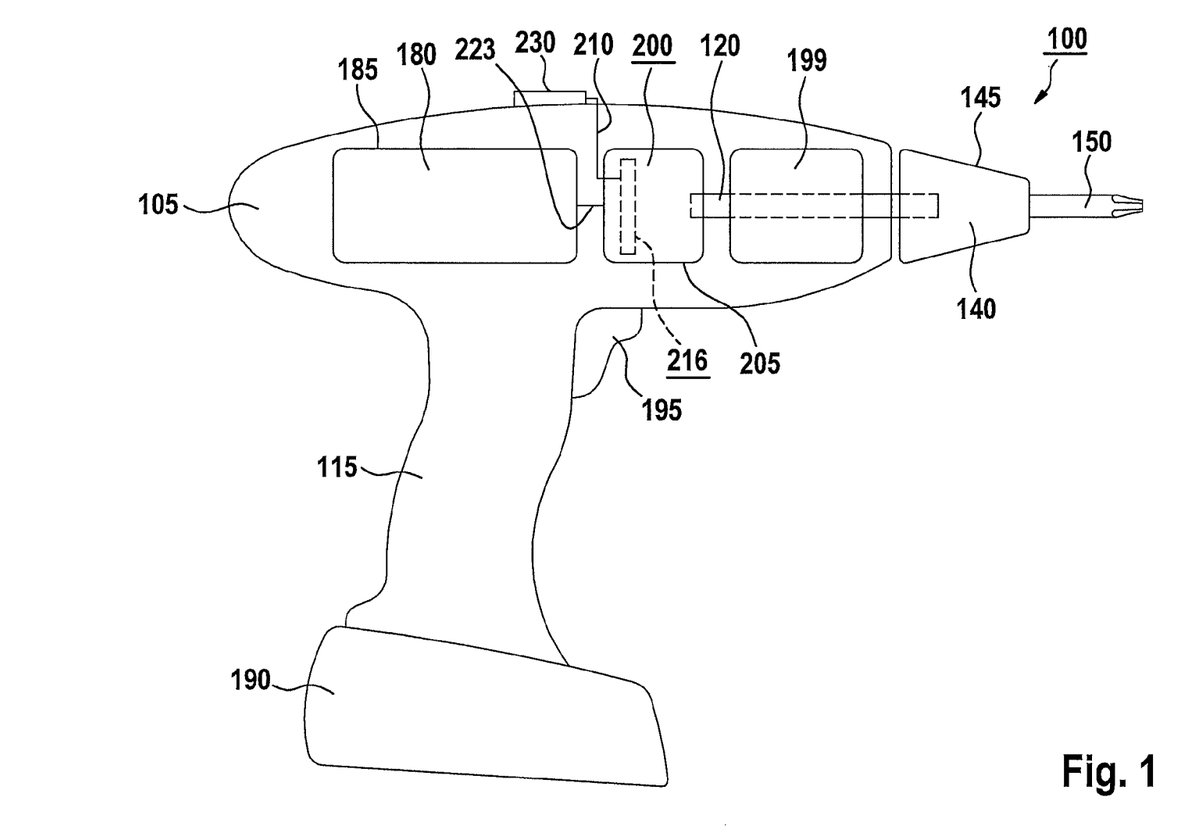
FIG. 1 shows a schematic view of a handheld power tool having a planetary gear set according to one first specific embodiment which is switchable between a first and a second gear.

FIG. 1 shows an exemplary handheld power tool 100 which has a tool housing 105 including a handle 115. According to one specific embodiment, handheld power tool 100 is designed in the form of a power tool which is connectable mechanically and electrically to a battery pack 190 for a cordless power supply. In FIG. 1, handheld power tool 100 is designed as a cordless combi drill as an example. It is, however, pointed out that the present invention is limited neither to power tools nor to cordless combi drills, but may rather be used in various handheld power tools in which a tool is set into rotation, e.g., in the case of a screwdriver, a percussion drill, etc., regardless of whether the power tool is operable with or without power.

A drive motor 180, which is operable via a manual switch 195, for example, and a gear set 200 are situated in tool housing 105, a torque clutch 199 being optionally assigned to gear set 200. As an example, drive motor 180 is situated in a motor housing 185 and gear set 200 in a gear housing 205, gear housing 205 and motor housing 185 being situated in tool housing 105 as an example and being fastened thereto, for example.

Drive motor 180 is illustratively designed for operation using a battery pack 190 and is supplied with power by the latter for this purpose, for example. Drive motor 180 is connected to a drive shaft 120, e.g., a drive spindle, via gear set 200. The mode of operation and the design of a suitable drive motor as well as a suitable torque clutch are conventional so that a detailed description thereof is dispensed with for the sake of a concise description of these components.

According to one specific embodiment, gear set 200 is a planetary gear set having different gear or planetary stages. The planetary gear set is rotatably driven by a drive element 223 of drive motor 180 during operation of handheld power tool 100. Planetary gear set 200 is switchable at least between a first and a second gear via an assigned operating element 230, which is illustratively connected to a sliding element 210. According to one specific embodiment, planetary gear set 200 is assigned a synchronization unit 216 which is designed to enable an improvement of a corresponding switching behavior of planetary gear set 200 at least during the switchover between the first and the second gear. Planetary gear set 200 is described below in detail for FIG. 2.

Illustratively, a tool holder 140, which has a drill chuck 145 as an example, is assigned to planetary gear set 200. This tool holder 140 is used to hold an insert tool 150 and may be integrally connected to drive shaft 120 drivable by drive motor 180 via planetary gear set 200, or may be connected to it in the form of an attachment.

Figure 2:
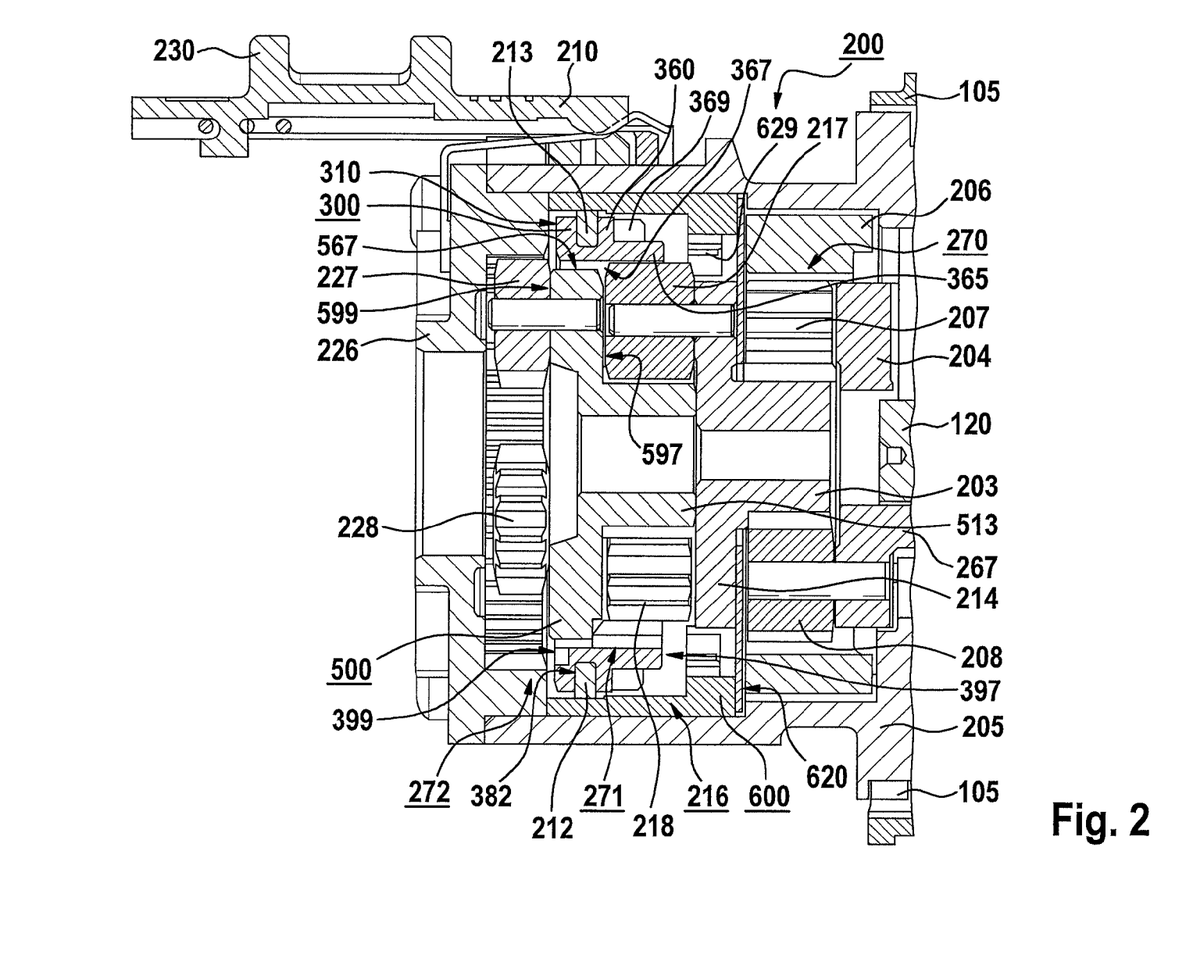
FIG. 2 shows an enlarged sectional view of the planetary gear set designed according to the first specific embodiment of the handheld power tool of FIG. 1.

FIG. 2 shows planetary gear set 200 of handheld power tool 100 of FIG. 1, which is designed according to one first specific embodiment and which is situated as an example in gear housing 205 of FIG. 1 fastened on tool housing 105. As described in FIG. 1, the planetary gear set is switchable between a first and a second gear via sliding element 210 of FIG. 1, which is connected to operating element 230 of FIG. 1 and which is provided with sliding webs 212, 213, as an example, and it illustratively has synchronization unit 216 of FIG. 1. It is, however, pointed out that the description of the two sliding webs 212, 213 is only of an exemplary nature and is not to be understood as a restriction of the present invention in which three or more sliding webs may also be used, for example.

Planetary gear set 200 illustratively has three gear or planetary stages situated in gear housing 205: a front stage 270, a central stage 271, and a rear stage 272. As an example, front planetary stage 270 has a sunwheel 203, at least one planetary wheel 207, 208, a planet carrier or entrainer 204 having a rotary entraining contour 267 for entraining drive shaft 120 illustratively connected to entrainer 204, as well as an annulus gear 206 which is situated axially and rotatably fixed in gear housing 205. In the context of the present invention, the term "axially fixed" refers to a type of fastening in which a movement in the axial direction is at least essentially prevented and is only possible within predefined tolerances.

Central planetary stage 271, for example, has a sunwheel 513, at least one planetary wheel 217, 218, a planet carrier 214, as well as a switching annulus gear 300 which is situated in gear housing 205 in an axially shiftable and rotatable or rotatably fixed manner depending on a switching position assigned to it in each case. Planet carrier 214 forms sunwheel 203 of front planetary stage 270; sunwheel 203 may be fastened appropriately to planet carrier 214 or may be integrally connected to it. Illustratively, planet carrier 214 and sunwheel 203 are designed as a single piece. Switching annulus gear 300 illustratively has a widened section 310 on its axial end area 399 (on the left in FIG. 2) which transitions into a tapered area 365 on its axial end area 397 (on the right in FIG. 2). As an example, widened section 310 forms an annular collar 360 on which an annular groove 382 is illustratively formed with which sliding webs 212, 213 mesh as an example in such a way that switching annulus gear 300 is twistable in relation to sliding webs 212, 213.

As an example, rear planetary stage 272 has a sunwheel, which is formed by drive element 223 of FIG. 1 and whose illustration has been dispensed with here for the sake of simplicity of the drawing, at least one planetary wheel 227, 228, a planet carrier 500 provided with an external toothing 567, as well as an annulus gear 226 situated in gear housing 205 in an axially and rotatably fixed manner. Planet carrier 500 forms sunwheel 513 of central planetary stage 271; sunwheel 513 may be fastened appropriately to planet carrier 500 or may be integrally connected to it. As an example, planet carrier 500 and sunwheel 513 are designed as a single piece, planet carrier 500 illustratively having an axial end 597 facing sunwheel 513 and an axial end 599 facing away from sunwheel 513.

On the outer periphery of switching annulus gear 300, a blocking element 600 is illustratively situated which is designed in the form of a blocking ring and is also referred to in the following as "blocking ring" for the sake of simplicity of the description. This blocking ring is rotatably fixedly fastened in gear housing 205, as an example, and extends, viewed in the axial direction of gear housing 205, approximately over an area which reaches from planet carrier 500 up to planet carrier 214; it may, however, also have a reduced axial length as an alternative hereto. It is, however, pointed out that blocking ring 600 is only an optional component whose use may be dispensed with in the case of a suitable configuration of gear housing 205, for example.

According to one specific embodiment, planetary gear set 200 is switchable between a first and a second gear, as described for FIG. 1. For this purpose, switching annulus gear 300 is axially shiftable at least between a first and a second switching position, the first switching position being assigned to the first gear and the second switching position being assigned to the second gear. Illustratively, switching annulus gear 300 is assigned synchronization unit 216 for improving the switching behavior of planetary gear set 200 which is at least designed to enable a synchronization of switching annulus gear 300 with planet carrier 500 or blocking ring 600 when switching annulus gear 300 is shifted between the first and the second switching position for the switchover of planetary gear set 200. Here, synchronization unit 216 in planetary gear set 200 is designed, as an example, to enable a synchronization of switching annulus gear 300 with planet carrier 500 when switching annulus gear 300 is axially shifted from its first into its second switching position for the switchover of planetary gear set 200 from the first into the second gear. In addition, synchronization unit 216 may be designed to enable a synchronization of switching annulus gear 300 with blocking ring 600 when switching annulus gear 300 is axially shifted from its second into its first switching position for the switchover of planetary gear set 200 from the second into the first gear. Synchronization unit 216 is described below for FIGS. 3 through 6.

In its first, right-hand switching position (not shown in FIG. 2), switching annulus gear 300 is, for example, rotatably fixedly coupled to blocking ring 600 and is thus rotatably fixedly situated in gear housing 205. Here, in the area of an axial end 397 (on the right in FIG. 2) of switching annulus gear 300, an external blocking toothing 369, which is formed on its outer periphery, is blocked by or is operatively meshed with an internal toothing 629 which is formed on blocking ring 600. Internal toothing 629 is formed in an axial end area 620 (on the right in FIG. 2) of blocking ring 600, as an example. In this way, a rotatably fixed blockage of switching annulus gear 300 in gear housing 205 is enabled in the first gear, switching annulus gear 300 being situated, viewed in the axial direction of gear housing 205, in the area of planetary wheels 217, 218 and planet carrier 214 of central planetary stage 271, so that planetary wheels 217, 218 may move along an internal toothing 367 provided on switching annulus gear 300 and thereby activate central planetary stage 271. Switching annulus gear 300 and planet carrier 500 are thus axially spaced apart from one another in the first gear.

In its second, left-hand switching position (shown in FIG. 2), switching annulus gear 300 is, for example, rotatably fixedly coupled to planet carrier 500 and rotatably movably situated in gear housing 205, internal toothing 367 of switching annulus gear 300 illustratively operatively meshing with both external toothing 567 of planet carrier 500 of rear planetary stage 272 and planetary wheels 217, 218 of central planetary stage 271, so that switching annulus gear 300, planetary wheels 217, 218, and planet carrier 500 rotate together during operation. In this way, central planetary stage 271 is deactivated in the second gear.

During operation of handheld power tool 100 of FIG. 1, the torque of drive motor 180 of FIG. 1 is transmitted to drive shaft 120 via planetary stages 272, 271, 270 of planetary gear set 200 with the aid of rotary entraining contour 267 of entrainer 204. Here, planetary gear set 200 functions according to one specific embodiment in the manner of a reduction gear unit in which a great torque and a small rotational speed are transmitted to drive shaft 120 in the first gear, for example, while, in comparison, a reduced torque and an increased rotational speed are transmitted in the second gear.

Figure 3:
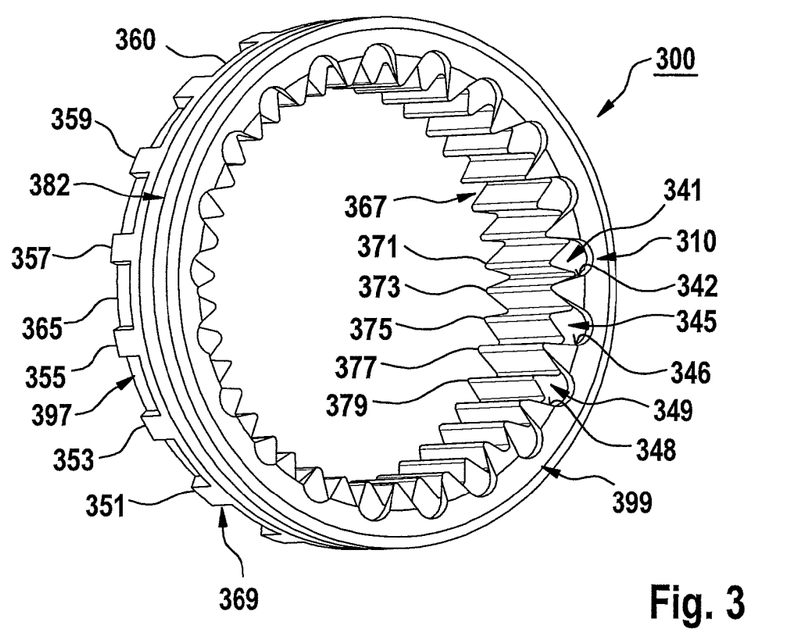
FIG. 3 shows an enlarged perspective view of a back side of the switching annulus gear of FIG. 2.

FIG. 3 shows a view of axial end area 399 of switching annulus gear 300 of FIG. 2 on which widened section 310 having annular collar 360 and ring groove 382 is formed.

Moreover, switching annulus gear 300 has, as described for FIG. 2, internal toothing 367 as well as tapered area 365 on its axial end area 397. Internal toothing 367 has, as an example, a plurality of teeth which point radially inward and of which only five teeth are identified by reference numerals 371, 373, 375, 377, 379 for the sake of simplicity and clarity of the drawing. In tapered area 365, a blocking toothing 369 having a plurality of blocking teeth is illustratively formed, of which only five teeth are identified by reference numerals 351, 353, 355, 357, 359 for the sake of simplicity and clarity of the drawing. This blocking toothing 369 is described below for FIG. 4.

According to one specific embodiment, synchronization unit 216 of FIGS. 1 and 2 is assigned a predefined number of the plurality of teeth 371, 373, 375, 377, 379 which point radially inward and which are shortened in their longitudinal direction. Illustratively, teeth 371, 375, 379 are each shortened by at least 0.2 mm in their longitudinal direction, for example. This shortening is formed as an example by a dent 342, 346, 348 provided at each of these teeth 371, 375, 379. These dents 342, 346, 348, which are assigned to synchronization unit 216 of FIGS. 1 and 2, are, for example, provided on axial ends 341, 345, and 349 of teeth 371, 375, and 379 which are situated in the area of axial end area 399 of switching annulus gear 300.

Viewed in the peripheral direction of switching annulus gear 300, every other of teeth 371,373,375,377,379 pointing radially inward is illustratively shortened in the longitudinal direction. It is, however, pointed out that also only every third, fourth, etc. of teeth 371, 373, 375, 377, 379 may be shortened in the longitudinal direction. Moreover, each group of teeth, e.g., two, three, or four teeth consecutive in the peripheral direction, may be shortened in each case, which may be adjacent to the non-shortened tooth groups which may each have one or more teeth. In this case, regular patterns, e.g., two shortened teeth are followed each time by two non-shortened teeth, etc., and also irregular patterns, e.g., two shortened teeth are followed each time by three or more non-shortened teeth, etc., may be provided.

Figure 4:
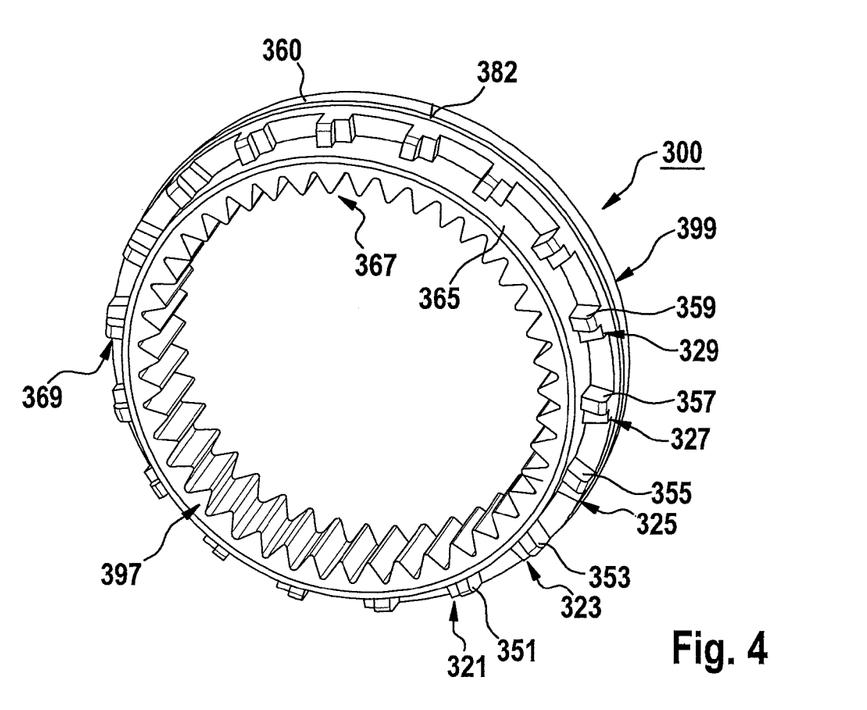
FIG. 4 shows an enlarged perspective view of a front side of the switching annulus gear of FIG. 2.

FIG. 4 shows a view of axial end area 397 of switching annulus gear 300 of FIGS. 2 and 3 to illustrate blocking toothing 369 which is illustratively formed on the outer periphery of tapered area 365 and which has the plurality of blocking teeth 351, 353, 355, 357, 359. The latter have meshing areas 321, 323, 325, 327 and 329 which are assigned as an example and which are stepped in the axial direction of switching annulus gear 300 of synchronization unit 216 and which are formed in the present example to implement an optimization of the clockwise rotation for planetary gear set 200 of FIGS. 1 and 2 in order to ensure, during the clockwise rotation and, in particular, during high torques, a complete overlapping of blocking teeth 351, 353, 355, 357, 359 by the assigned teeth which offer security against twisting (621, 623, 625, 627, 628 in FIG. 6) of blocking ring 600 of FIG. 2. During the counterclockwise rotation, only a partial overlapping of stepped meshing areas 321, 323, 325, 327 and 329 is implemented in each case by the teeth which offer security against twisting (621, 623, 625, 627, 628 in FIG. 6) of blocking ring 600 of FIG. 2. It is, however, pointed out that the illustrated implementation of the optimization of the clockwise rotation is only of an exemplary nature and is not to be understood as a restriction of the present invention which may rather also be implemented with the aid of the optimization of a counterclockwise rotation or a counterclockwise and clockwise rotation.

Figure 5:
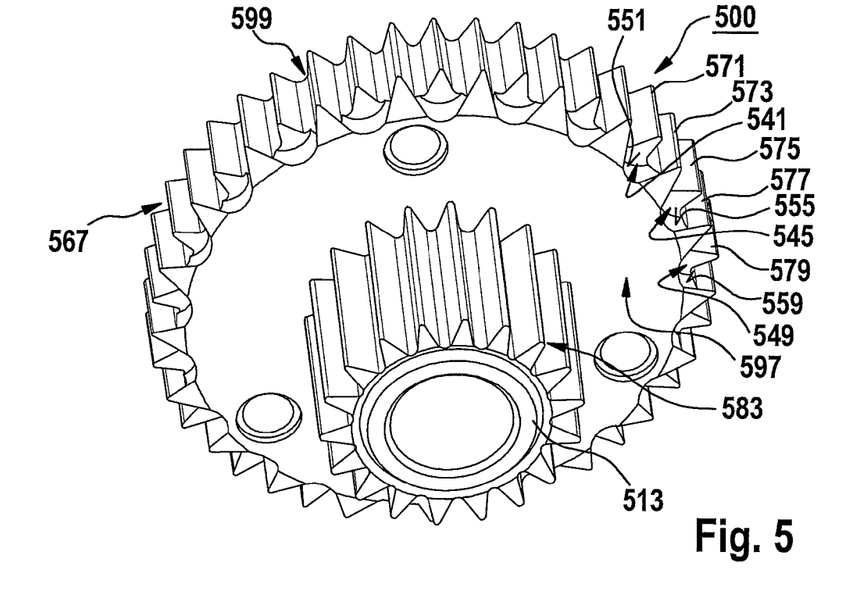
FIG. 5 shows an enlarged perspective view of a planet carrier of FIG. 2.

FIG. 5 shows planet carrier 500 of rear planetary stage 272 of FIG. 2 on axial end 597 of which sunwheel 513 of central planetary stage 271 of FIG. 2 is situated, this sunwheel being illustratively provided with an exemplary, external toothing 583. As described above, planet carrier 500 has external toothing 567 on its outer periphery, as an example. This external toothing has a plurality of teeth which point radially outward and of which only five teeth are identified by reference numerals 571, 573, 575, 577, 579 for the sake of simplicity and clarity of the drawing.

According to one specific embodiment, synchronization unit 216 of FIGS. 1 and 2 is assigned a predefined number of the plurality of teeth which point radially outward and which are each shortened in the longitudinal direction. Teeth 571, 575, 579 are illustratively shortened in their longitudinal direction, e.g., by at least 0.2 mm in each case, a dent 551, 555 and 559 which is assigned to synchronization unit 216 of FIGS. 1 and 2 being formed as an example at each of these teeth 571, 575, 579. These dents 551, 555, 559 are, for example, provided on axial ends 541, 545 and 549 of teeth 571,575 and 579 which are situated in the area of a side facing switching annulus gear 300 in FIG. 2 or on an axial end 597 of planet carrier 500.

Illustratively, viewed in the peripheral direction of planet carrier 500, at least every other of teeth 571, 573, 575, 577, 579 pointing radially outward is shortened in its longitudinal direction. It is, however, pointed out that here too, different embodiments are implementable similarly to the description above for FIG. 3 in relation to internal toothing 367 of switching annulus gear 300.

Figure 6:
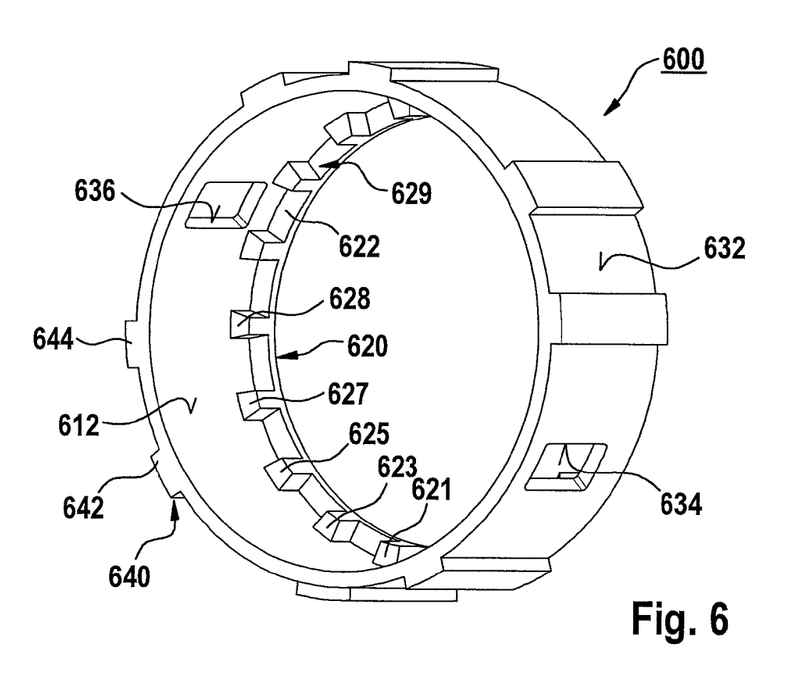
FIG. 6 shows an enlarged perspective view of the blocking ring of FIG. 2.

FIG. 6 shows blocking ring 600 of FIG. 2 in whose axial end area 620 internal toothing 629 is formed and which has a plurality of teeth as an example which offer security against twisting and of which only five teeth are identified by reference numerals 621, 623, 625, 627, 628 for the sake of simplicity and clarity of the drawing. These teeth illustratively extend in a direction pointing away from axial end area 620 starting from an annular shoulder 622 provided on an axial end area 620 along inner periphery 612 of blocking ring 600 and are formed for the cooperation with blocking toothing 369 of switching annulus gear 300 of FIGS. 2 through 4.

According to one specific embodiment, a fastening unit 640 is provided on outer periphery 632 of blocking ring 600 for rotatably fixedly fastening blocking ring 600 in gear housing 205 of FIGS. 1 and 2. This fastening unit has as an example a predefined number of protrusions which are directed radially outward and which mesh with assigned recesses of gear housing 205 of FIGS. 1 and 2. For the sake of simplicity and clarity of the drawing, only two protrusions are identified by reference numerals 642, 644. Moreover, two openings 634, 636 are provided on blocking ring 600 as an example for the passage of sliding webs 212 and 213 of FIG. 2.

Figure 7:
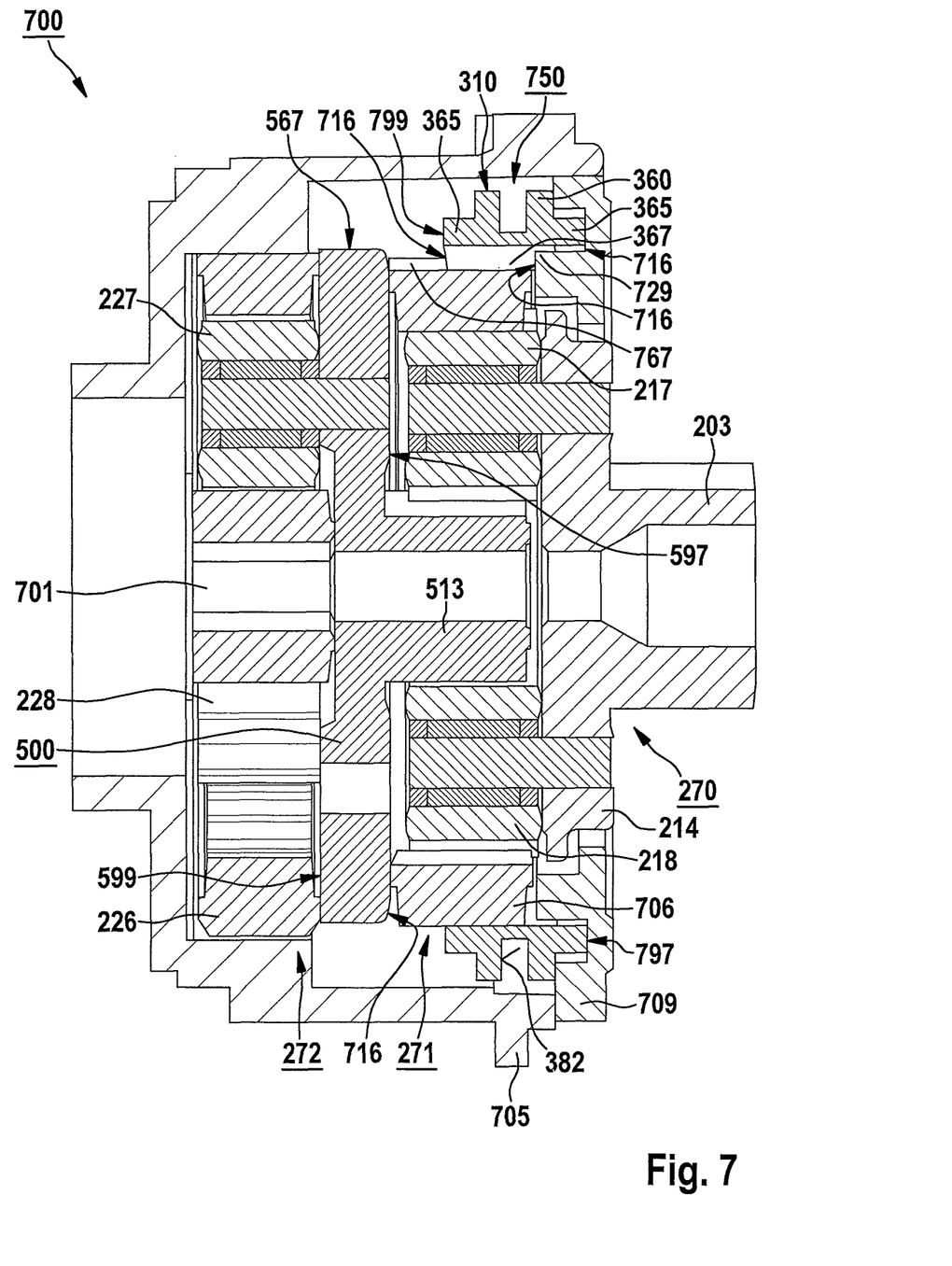
FIG. 7 shows an enlarged sectional view of a planetary gear set designed according to a second specific embodiment to be used with the handheld power tool of FIG. 1.

FIG. 7 shows a planetary gear set 700 which is designed according to one second specific embodiment and provided with a synchronization unit 716, and which is also switchable between a first and a second gear and may be used to implement planetary gear set 200 of FIGS. 1 and 2 or which may be used together with handheld power tool 100 of FIG. 1 instead of planetary gear set 200. Planetary gear set 700 is illustratively situated in a gear housing 705, which is fastened, for example, to tool housing 105 of FIGS. 1 and 2 and has as an example three planetary stages 270, 271, 272 of FIG. 2, rear planetary stage 272 being drivable by a sunwheel 701 as an example which is, for example, formed by a pinion assigned to drive motor 180 of FIG. 1.

In contrast to FIG. 2, central planetary stage 271, however, has here as an example an annulus gear 706 which is situated axially fixedly, but radially movably in gear housing 705 and which has an external blocking toothing 767, and planet carrier 214 is situated at least sectionally within a blocking element 709 which is rotatably fixedly connected to gear housing 705 and designed in the form of a blocking ring, for example, and which is referred to in the following as "blocking ring" and fastens planet carrier 214 axially fixedly, but radially movably in gear housing 705 and furthermore has a blocking toothing 729. In the context of the present invention, the term "radially movable" refers to a type of configuration in which a movement is possible in the peripheral direction.

Furthermore, as another difference with FIG. 2, a switching annulus gear 750 is provided which is designed for switching between the first and the second gear and which couples annulus gear 706 to blocking ring 709 in its first switching position shown in FIG. 7 in its first gear of planetary gear set 700. Here, switching annulus gear 750 is, on the one hand, operatively meshed with blocking ring 709 and is rotatably fixedly fastened by it in gear housing 705; on the other hand, switching annulus gear 750 is operatively meshed with annulus gear 706 and thus, in turn, rotatably fixedly fastens it in gear housing 705. In this way, central planetary stage 271 is activated, so that the first gear is activated at a comparably high torque.

In its second switching position (on the left in FIG. 7) in the second gear of planetary gear set 700, switching annulus gear 750, however, couples annulus gear 706 to planet carrier 500, so that switching annulus gear 750 and annulus gear 706 are radially movable together with planet carrier 500 in gear housing 705. In this way, central planetary stage 271 is deactivated, so that the second gear is activated at a comparably low torque.

Similarly to switching annulus gear 300 of FIGS. 2 through 4, switching annulus gear 750 illustratively has widened section 310, which forms annular collar 360, as an example, on which ring groove 382 is provided into which sliding webs 212, 213 of FIG. 2 may engage, for example, so that switching annulus gear 750 is twistable in relation to sliding webs 212, 213 and is shiftable between a first and a second switching position via these sliding webs 212, 213 and via sliding element 210 of FIG. 1, which is connected to operating element 230, for example. On both of its axial ends 797, 799, switching annulus gear 750 has tapered area 365 and on its inner periphery, it has internal toothing 367.

Synchronization unit 716 which is formed on switching annulus gear 750, blocking ring 709, and planet carrier 500, is designed to enable an improvement of a corresponding switching behavior of planetary gear set 700 at least during the switchover between the first and the second gear. Here, the design and mode of operation of synchronization unit 716 correspond at least generally, for example, to the design and mode of operation of synchronization unit 216 of FIG. 2, so that a detailed description thereof is dispensed with for the sake of a concise description.

Figure 8:
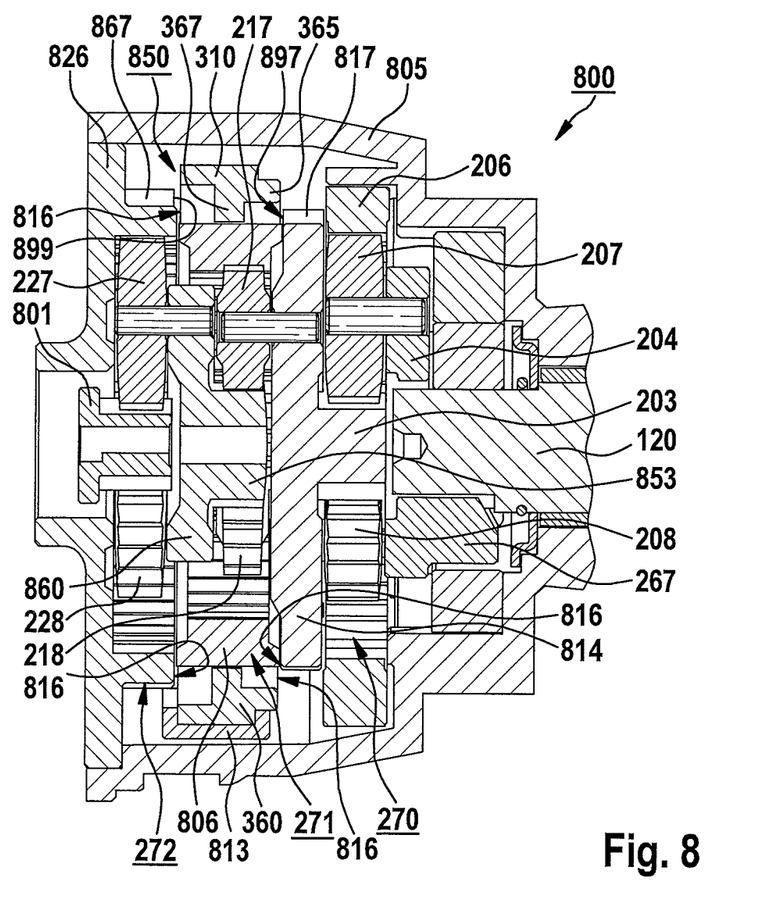
FIG. 8 shows an enlarged sectional view of a planetary gear set designed according to a third specific embodiment to be used with the handheld power tool of FIG. 1.

FIG. 8 shows a planetary gear set 800 which is designed according to one third specific embodiment, which is provided with a synchronization unit 816, and which is also switchable between a first and a second gear and may be used to implement planetary gear set 200 of FIGS. 1 and 2 or which may be used together with handheld power tool 100 of FIG. 1 instead of planetary gear set 200. Planetary gear set 800 is illustratively situated in a gear housing 805, which is fastened as an example to tool housing 105 of FIGS. 1 and 2 and has as an example three planetary stages 270, 271, 272 of FIG. 2, rear planetary stage 272 being drivable by a sunwheel 801 as an example which is, for example, formed by a pinion assigned to drive motor 180 of FIG. 1.

In contrast to FIG. 2, rear planetary stage 272 has a rear annulus gear 826, as an example, which is provided for accommodating planetary wheels 227, 228, which is situated axially and rotatably fixedly in gear housing 805, and on whose outer periphery, a blocking toothing 867 is illustratively formed; rear planetary stage 272 also has a planet carrier 860 situated in a central annulus gear 806. Rear annulus gear 826 thus forms as an example an annular blocking element and is thus also referred to in the following as "blocking ring." In contrast to FIG. 2, central planetary stage 271 has planetary wheels 217, 218, which are also situated in central annulus gear 806, as well as a planet carrier 814, which forms sunwheel 203 of front planetary stage 270 and on whose outer periphery an external toothing 817 is illustratively provided. Here, planet carrier 814 may be fastened appropriately to sunwheel 203 or integrally connected to it or designed in one piece with it. Moreover, central planetary stage 271 has a sunwheel 853, as an example, which may be fastened appropriately to planet carrier 860 of rear planetary stage 272 or may be integrally connected to it or may be designed in one piece with it.

As another difference with FIG. 2, a switching annulus gear 850 is moreover provided which is designed for switching between the first and the second gear, which is axially shiftable and radially movable in gear housing 805, and which is rotatably fixedly connected to central annulus gear 806. Switching annulus gear 850 is shiftable in the axial direction of gear housing 805 between its first and second switching position and is situated, as an example, at least sectionally in a sliding member 813. The latter has, for example, a semi-annular shape having a U profile directed radially inward, in which switching annulus gear 850 is rotatably mounted. Sliding member 813 and together with it switching annulus gear 850 are, for example, shiftable between the first and the second switching position via sliding element 210 of FIG. 1 connected to operating element 230.

Similarly to switching annulus gear 300 of FIGS. 2 through 4, switching annulus gear 850 illustratively has widened section 310 which forms annular collar 360 as an example, tapered area 365 being formed on an axial end 797, 799 (on the right in FIG. 8) of switching annulus gear 850 and internal toothing 367 being provided on the inner periphery of switching annulus gear 850. On switching annulus gear 850, in at least one axial end area 899 (on the left in FIG. 8) of blocking ring 826 and [in] at least one axial end area 897 (on the right in FIG. 8) of planet carrier 814, synchronization unit 816 is illustratively designed to enable an improvement of a corresponding switching behavior of planetary gear set 800 at least during the switchover between the first and the second gear. Here, the design and mode of operation of synchronization unit 816, for example, correspond at least generally to the design and mode of operation of synchronization unit 216 of FIG. 2, so that a detailed description thereof is dispensed with for the sake of a concise description.

During the switchover into the first gear, switching annulus gear 850 is shifted due to a shift of sliding member 813 in the direction of blocking ring 826 from or via the central position shown in FIG. 8 into its first switching position which is assigned to the first gear. In this first switching position, internal toothing 367 of switching annulus gear 850 meshes with blocking toothing 867 of blocking ring 826 of rear planetary stage 272. Switching annulus gear 850 is thus rotatably fixedly connected to blocking ring 826, so that a great torque and a low rotational speed are transmitted to drive shaft 120. Due to a shift of sliding member 813 in the direction of planet carrier 814, switching annulus gear 850 is shifted from or via the central position shown in FIG. 8 into its second switching position which is assigned to the second gear. Here, internal toothing 367 of switching annulus gear 850 meshes with the external toothing of planet carrier 814 of central planetary stage 271, so that switching annulus gear 850 becomes radially movably connected to planet carrier 814. Thus, a reduced torque and an increased rotational speed may be transmitted as compared to the operation in the first gear.

Since the design and the mode of operation of planetary gear sets having a gear switchover are generally known, a further description of planetary gear sets 200, 700, and 800 of FIGS. 2, 7, and 8 is dispensed with for the sake of a concise description. Moreover, it is pointed out that only synchronization unit 216 of FIGS. 1 and 2 is described in detail for the sake of a concise description, since conferring its design and mode of operation upon synchronization unit 716 of FIGS. 7 and 816 of FIG. 8 will be understood based on the description of synchronization unit 216 of FIGS. 1 and 2.

What is claimed is:

1. A handheld power tool, comprising:
a planetary gear set which is switchable between at least a first and a second gear of the planetary gear set;
a switching annulus gear assigned to the planetary gear set and shiftable between at least a first and a second switching position, wherein the first switching position is assigned to the first gear and the second switching position is assigned to the second gear,
wherein the switching annulus gear is assigned a synchronization unit which is configured to synchronize the switching annulus gear with one of a planet carrier or a blocking element of the planetary gear set when the switching annulus gear is shifted between the first and the second switching position,
wherein the switching annulus gear is rotatably fixedly situated in an assigned gear housing in the first gear of the planetary gear set and rotatably mounted in the gear housing in the second gear of the planetary gear set, the switching annulus gear having an internal toothing and the planet carrier having an external toothing, and the internal toothing being operatively meshed with the external toothing in the second gear of the planetary gear set,
wherein the internal toothing has a plurality of teeth pointing radially inward, a predefined number of teeth being shortened in a longitudinal direction,
wherein on an axial end area of the switching annulus gear, which faces the planet carrier, a dent assigned to the synchronization unit is formed at each tooth of the predefined number of teeth of the internal toothing to shorten each tooth of the predefined number of teeth.

2. The handheld power tool as recited in claim 1, wherein each tooth of the predefined number of teeth of the internal toothing is shortened by at least 0.2 mm in the longitudinal direction.

3. The handheld power tool as recited in claim 1, wherein in a peripheral direction of the switching annulus gear, at least every other of the teeth of the internal toothing pointing radially inward is shortened in the longitudinal direction.

4. The handheld power tool as recited in claim 1, wherein the external toothing has a plurality of teeth pointing radially outward, a predefined number of teeth of the external toothing being shortened in the longitudinal direction.

5. The handheld power tool as recited in claim 4, wherein each tooth of the predefined number of teeth of the external toothing is shortened by at least 0.2 mm in the longitudinal direction.

6. The handheld power tool as recited in claim 4, wherein on a side of the planet carrier, which faces the switching annulus gear, a dent assigned to the synchronization unit is formed at each tooth of the predefined number of teeth of the external toothing to shorten the tooth.

7. The handheld power tool as recited in claim 4, wherein in a peripheral direction of the planet carrier, at least every other of the teeth of the external toothing pointing radially outward is shortened in the longitudinal direction.

8. The handheld power tool as recited in claim 1, wherein on the switching annulus gear an external blocking toothing is provided which is designed to enable a rotatably fixed blockage of the switching annulus gear in the gear housing in the first gear of the planetary gear set.

9. The handheld power tool as recited in claim 8, wherein in the gear housing, the internal toothing is provided which is operatively meshed with the external blocking toothing in the first gear of the planetary gear set.

10. The handheld power tool as recited in claim 9, wherein the internal toothing is provided on the blocking element.

11. The handheld power tool as recited in claim 8, wherein at least the external blocking toothing has at least one predefined number of blocking teeth at which stepped meshing areas are formed which are assigned to the synchronization unit.

12. A planetary gear set which is switchable between at least a first and a second gear of the planetary gear set and which is assigned a switching annulus gear which is shiftable between at least a first and a second switching position,
wherein the first switching position is assigned to the first gear and the second switching position is assigned to the second gear,
wherein the switching annulus gear is assigned a synchronization unit which is configured to synchronize the switching annulus gear with one of a planet carrier or with a blocking element of the planetary gear set when the switching annulus gear is shifted between the first and the second switching position,
wherein the switching annulus gear is rotatably fixedly situated in an assigned gear housing in the first gear of the planetary gear set and rotatably mounted in the gear housing in the second gear of the planetary gear set, the switching annulus gear having an internal toothing and the planet carrier having an external toothing, and the internal toothing being operatively meshed with the external toothing in the second gear of the planetary gear set,
wherein the internal toothing has a plurality of teeth pointing radially inward, a predefined number of teeth being shortened in a longitudinal direction,
wherein on an axial end area of the switching annulus gear, which faces the planet carrier, a dent assigned to the synchronization unit is formed at each tooth of the predefined number of teeth of the internal toothing to shorten each tooth of the predefined number of teeth having the dent.

13. A handheld power tool, comprising:
a planetary gear set which is switchable between at least a first and a second gear of the planetary gear set;
a switching annulus gear assigned to the planetary gear set and shiftable between at least a first and a second switching position, wherein the first switching position is assigned to the first gear and the second switching position is assigned to the second gear,
wherein the switching annulus gear is assigned a synchronization unit which is configured to synchronize the switching annulus gear with one of a planet carrier or a blocking element of the planetary gear set when the switching annulus gear is shifted between the first and the second switching position,
wherein the switching annulus gear is rotatably fixedly situated in an assigned gear housing in the first gear of the planetary gear set and rotatably mounted in the gear housing in the second gear of the planetary gear set, the switching annulus gear having an internal toothing and the planet carrier having an external toothing, and the internal toothing being operatively meshed with the external toothing in the second gear of the planetary gear set,
wherein on the switching annulus gear an external blocking toothing is provided which is designed to enable a rotatably fixed blockage of the switching annulus gear in the gear housing in the first gear of the planetary gear set, wherein in the gear housing, an internal toothing is provided which is operatively meshed with the external blocking toothing in the first gear of the planetary gear set, wherein at least the external blocking toothing has at least one predefined number of blocking teeth at which stepped meshing areas are formed which are assigned to the synchronization unit.

14. The handheld power tool as recited in claim 13, wherein the internal toothing is provided on the blocking element.

15. The handheld power tool as recited in claim 13, wherein the internal toothing has a plurality of teeth pointing radially inward, a predefined number of teeth of the internal toothing being shortened in a longitudinal direction.

16. The handheld power tool as recited in claim 15, wherein each tooth of the predefined number of teeth of the internal toothing is shortened by at least 0.2 mm in the longitudinal direction.

17. The handheld power tool as recited in claim 15, wherein on an axial end area of the switching annulus gear, which faces the planet carrier, a dent assigned to the synchronization unit is formed at each tooth of the predefined number of teeth of the internal toothing to shorten the tooth.

18. The handheld power tool as recited in claim 15, wherein in a peripheral direction of the switching annulus gear, at least every other of the teeth of the internal toothing pointing radially inward is shortened in the longitudinal direction.

19. The handheld power tool as recited in claim 15, wherein the external toothing has a plurality of teeth pointing radially outward, a predefined number of teeth being shortened in the longitudinal direction.

20. The handheld power tool as recited in claim 19, wherein each tooth of the predefined number of teeth of the external toothing is shortened by at least 0.2 mm in the longitudinal direction.

21. The handheld power tool as recited in claim 20, wherein on a side of the planet carrier, which faces the switching annulus gear, a dent assigned to the synchronization unit is formed at each tooth of the predefined number of teeth of the external toothing to shorten the tooth.

22. The handheld power tool as recited in claim 20, wherein in a peripheral direction of the planet carrier, at least every other of the teeth of the external toothing pointing radially outward is shortened in the longitudinal direction.

* * * * *